US009069206B2

(12) United States Patent
Kang et al.

(10) Patent No.: US 9,069,206 B2
(45) Date of Patent: Jun. 30, 2015

(54) CIRCUIT BOARD, BACKLIGHT UNIT AND LIQUID CRYSTAL DISPLAY DEVICE WITH THE SAME

(75) Inventors: Taegu Kang, Anyang-si (KR); Mangeun Kim, Anyang-si (KR); Hyouk Kwon, Seongnam-si (KR)

(73) Assignee: LG ELECTRONICS INC., Seoul (KR)

( * ) Notice: Subject to any disclaimer, the term of this patent is extended or adjusted under 35 U.S.C. 154(b) by 239 days.

(21) Appl. No.: 13/338,768

(22) Filed: Dec. 28, 2011

(65) Prior Publication Data

US 2013/0002981 A1 Jan. 3, 2013

(30) Foreign Application Priority Data

Jul. 1, 2011 (KR) ........................ 10-2011-0065473

(51) Int. Cl.
*G02F 1/1335* (2006.01)
*F21V 7/04* (2006.01)
*F21V 8/00* (2006.01)
*G09G 3/34* (2006.01)

(52) U.S. Cl.
CPC ........ *G02F 1/133603* (2013.01); *G02B 6/0083* (2013.01); *G02B 6/0085* (2013.01); *G02F 1/133608* (2013.01); *G02F 2001/133612* (2013.01); *G02F 2201/54* (2013.01); *G02B 6/0021* (2013.01); *G02B 6/0068* (2013.01); *G09G 3/3406* (2013.01); *G09G 2320/0233* (2013.01); *G09G 2380/02* (2013.01)

(58) Field of Classification Search
CPC .. G02B 6/0083; G02B 6/4281; G02B 6/0073; G02B 6/0078; G02B 6/0085; G02B 6/0021; G02B 6/0068; G02F 1/133603; G02F 1/133608; G02F 2001/133612; G02F 2201/54; H05B 33/0806; H05B 33/08; G09G 3/3406; G09G 2320/0233; G09G 2380/02
USPC ................... 349/61–62; 362/612, 615, 618, 362/630–631; 313/498
See application file for complete search history.

(56) References Cited

U.S. PATENT DOCUMENTS

| 7,780,306 B2 * | 8/2010 | Hoshi ........................ 362/97.1 |
| 2009/0097254 A1 * | 4/2009 | Kawashima et al. ......... 362/294 |
| 2009/0316389 A1 * | 12/2009 | Park et al. ................... 362/97.1 |
| 2010/0110329 A1 | 5/2010 | Kubota et al. |
| 2010/0177263 A1 * | 7/2010 | Kuramoto ..................... 349/62 |
| 2011/0037740 A1 * | 2/2011 | Yamaguchi ................... 345/204 |
| 2011/0181809 A1 * | 7/2011 | Sekiguchi et al. ............. 349/62 |
| 2011/0227494 A1 * | 9/2011 | Lee et al. ...................... 315/192 |

FOREIGN PATENT DOCUMENTS

| JP | 2004-117435 A | 4/2004 |
| JP | 2007-180021 A | 7/2007 |

(Continued)

*Primary Examiner* — Nathanael R Briggs
(74) *Attorney, Agent, or Firm* — Birch, Stewart, Kolasch & Birch, LLP

(57) ABSTRACT

The present invention relates to a device which comprises a light source of a light emitting device, and more particularly to a circuit board, a backlight unit and a liquid crystal display device with the same. The backlight unit comprises a circuit board having a first line with circuit lines provided thereto, a plurality of second lines connected to the first line each to have elasticity at least at a point connected to the first line, and a light emitting device mounting portion connected to the second line and electrically connected to the circuit line, and a light guide plate positioned on the circuit board.

18 Claims, 19 Drawing Sheets

(56) References Cited  * cited by examiner

FOREIGN PATENT DOCUMENTS

| JP | 2010-107753 A | 5/2010 |
| KR | 10-2008-0051628 A | 6/2008 |
| KR | 10-2010-0061059 A | 6/2010 |

CIRCUIT BOARD, BACKLIGHT UNIT AND LIQUID CRYSTAL DISPLAY DEVICE WITH THE SAME

CROSS REFERENCE TO RELATED APPLICATION

This application claims the benefit of the Patent Korean Application No. 10-2011-0065473, filed on Jul. 1, 2011, which is hereby incorporated by reference as if fully set forth herein.

BACKGROUND OF THE DISCLOSURE

1. Field of the Disclosure

The present invention relates to a device which comprises a light source of a light emitting device, and more particularly to a circuit board, a backlight unit and a liquid crystal display device with the same.

2. Discussion of the Related Art

In general, of display devices, LCD (Liquid Crystal Display Device) has various applications, starting from television sets, to notebook computers, monitors for desk top computers, and cellular phones.

Since the LCD can not emit a light for itself, in order to display image information, a lighting device is required for illumination of a liquid crystal display panel.

Since the lighting device for the LCD is coupled to a back side of the liquid crystal display panel, the lighting device is called as a backlight unit that forms a surface light source for providing a light to the liquid crystal display panel.

A general back-light unit is provided with a light source, a light guide plate, a diffusion sheet, a prism sheet, a protective sheet, and so on, and as the light source, fluorescent lamps, such as mercury cold cathode fluorescent lamps, light emitting diodes, or the like may be used.

SUMMARY OF THE DISCLOSURE

Accordingly, the present invention is directed to a circuit board, a backlight unit and a liquid crystal display device with the same.

An object of the present invention is to provide, in a backlight unit which uses a light emitting device and a light guide plate, a circuit board having the light emitting device mounted thereto and mechanical flexibility given thereto for minimizing mechanical deformation which is liable to take place when two materials which have heat expansion coefficients different from each other are adhered together, for improving reliability of a picture quality; a backlight unit, and a liquid crystal display device with the same.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a backlight unit comprises a circuit board comprising a first line having circuit lines provided thereto, a plurality of second lines connected to the first line to have elasticity at least at a point connected to the first line, and a light emitting device mounting portion connected to the second line and electrically connected to the circuit line, and a light guide plate on the circuit board.

In a second aspect of the present invention, a backlight unit comprises a circuit board having a light emitting device mounted thereto, a light guide plate having at least a portion of the circuit board attached thereto, and a heat expansion compensating portion provided to the circuit board for having mechanical deformation in conformity with heat expansion or contraction of the light guide plate owing to elasticity.

In a third aspect of the present invention, a circuit board in a backlight unit comprises a first line having a circuit line and a terminal connected to the circuit line, a plurality of second lines branched from the first line spaced from one another each to have elasticity at least at a branch point, and a light emitting device mounting portion positioned at an end portion of the second line electrically connected to the circuit line at the first line through the second line.

In a fourth aspect of the present invention, a liquid crystal display device comprises a backlight unit comprising a circuit board having a first line with circuit lines provided thereto, a plurality of second lines connected to the first line to have elasticity at least at a point connected to the first line, and a light emitting device mounting portion connected to the second line and electrically connected to the circuit line, and a light guide plate on the circuit board, and a liquid crystal panel on the backlight unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are comprised to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

While the present invention permits different variations and modifications, specific embodiment thereof will be illustrated with drawings and will be described hereinafter. However, the present invention is not intended to limit the present invention to a specific one disclosed herein, and contrary to this, the present invention comprises all modifications, substitutions, equivalences thereof in agreement of the aspect of the present invention defined by the claims of the present invention.

In a case if it is described that an element, like a layer, a region, or a substrate, is "on" other element, it is understandable that the element is on the other element directly, or there may be another intermediate element between the two elements.

Even though words, such as first and second, may be used for describing different elements, components, areas, layers and/or regions, it is understandable that the elements, components, regions, layers and/or regions are not limited by such words.

Figure 1:
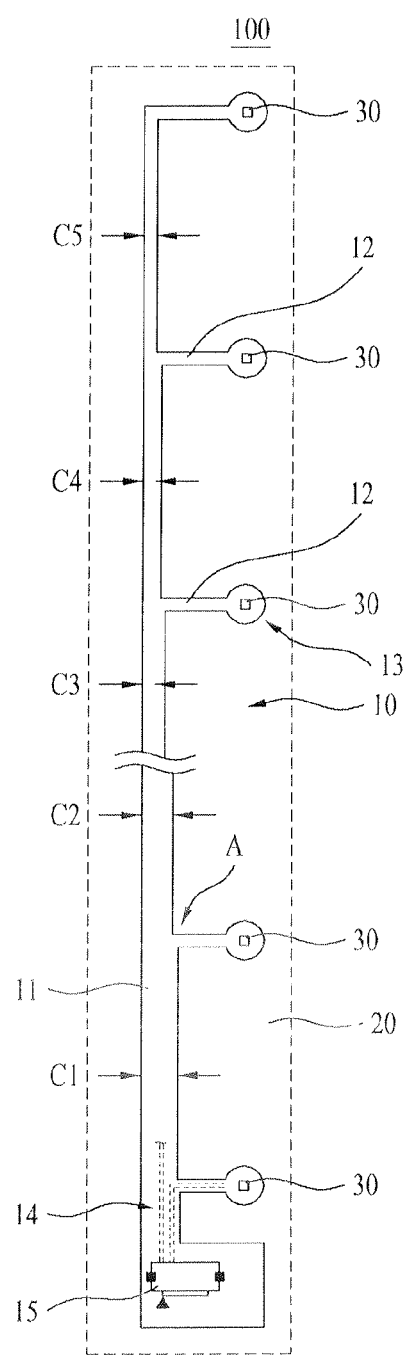
FIG. 1 illustrates a schematic view of a first example of a circuit board.

Referring to FIG. 1, the backlight unit 100 comprises a circuit board 10, and a light guide plate 20 on the circuit board 10.

The circuit board 10 is positioned in a first direction, and comprises a first line 11 having circuit lines provided thereto, and a plurality of second lines 12 connected to the first line 11, each with elasticity at least at a connection point A between the first line 11 and the second line 12.

Figure 2:
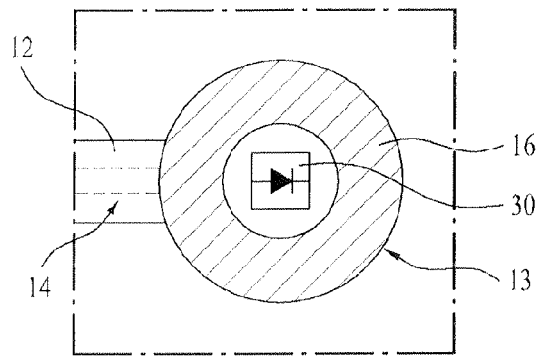
FIG. 2 illustrates an enlarged view of a first example of a mounting portion in a circuit board.

Referring to FIG. 2, the second line 12 has a light emitting device mounting portion 13 at an end portion thereof for mounting the light emitting device 30 thereon. The light emitting device 30 may be a light emitting diode LED.

The light emitting device mounting portion 13 may have an adhesive portion 16 on a portion thereof on one side of the light emitting device 30. FIG. 2 illustrates an example in which the adhesive portion 16 is positioned around the light emitting device 30.

The mounting portion 13 may be circular as shown in FIG. 2, square, or other shapes. FIG. 2 illustrates an example in which the mounting portion 13 has a size larger than a width of the second line 12.

Figure 3:
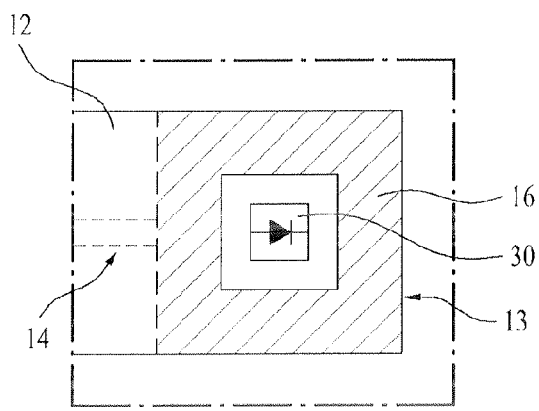
FIG. 3 illustrates an enlarged view of a second example of a mounting portion in a circuit board.
Figure 4:
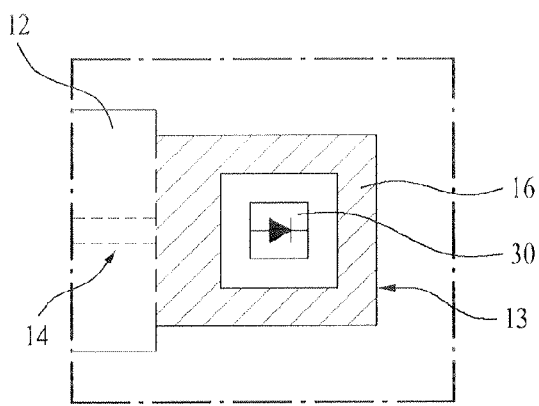
FIG. 4 illustrates an enlarged view of a third example of a mounting portion in a circuit board.

In the meantime, referring to FIG. 3, the mounting portion 13 may have a size (width) the same with the width of the second line 12, or as shown in FIG. 4, smaller than the width of the second line 12.

Thus, sizes (widths) of the second line 12 and the mounting portion 13 may vary, and the mounting portion 13 may have different shapes, such as a circle, a polygon, and the like.

The light emitting device mounting portion 13 may be connected to the circuit line 14 at the first line 11, electrically. That is, the circuit line 14 is provided along the first line 11, connected up to the mounting portion 13 via the second line 12, for driving the light emitting device 30 mounted to the mounting portion 13.

Though a detailed shape and a number of the circuit line 14 are omitted, the first line 11 may have the circuit lines 14 as many as, or more than, a total number of the second lines 12.

The circuit line 14 may be connected to a terminal 15 at an end side of the first line 11. Therefore, the light emitting device 30 may be connected to a driving unit with the connection portion (Not shown) connected to the terminal 15, electrically.

The circuit lines 14 are connected to the light emitting device mounting portions 13 through the plurality of second lines 12, respectively. Therefore, a number of the circuit lines 14 may be the fewer as the circuit lines 14 are the farther from the terminal 15.

For an example, though the first line 11 at the terminal 15 side may have the number of the circuit lines 14 as many as a total number of the second lines 12 (Or, as many as a total number of the light emitting devices 30 provided to one circuit board 10), there may be the circuit line 14 which may be connected to one light emitting device 30 at an upper end portion of the first line 11.

Therefore, numbers of circuit lines 14 provided to the first line 11 may be different from one another. If this is taken into account, as shown in FIG. 1, a width C1, C2, C3, C4, or C5 of the first line 11 may become the smaller as the first line 11 becomes the farther from the terminal 15. That is, as the first line 11 passes one of the second lines 12, the width of the first line 11 may become the smaller.

Figure 5:
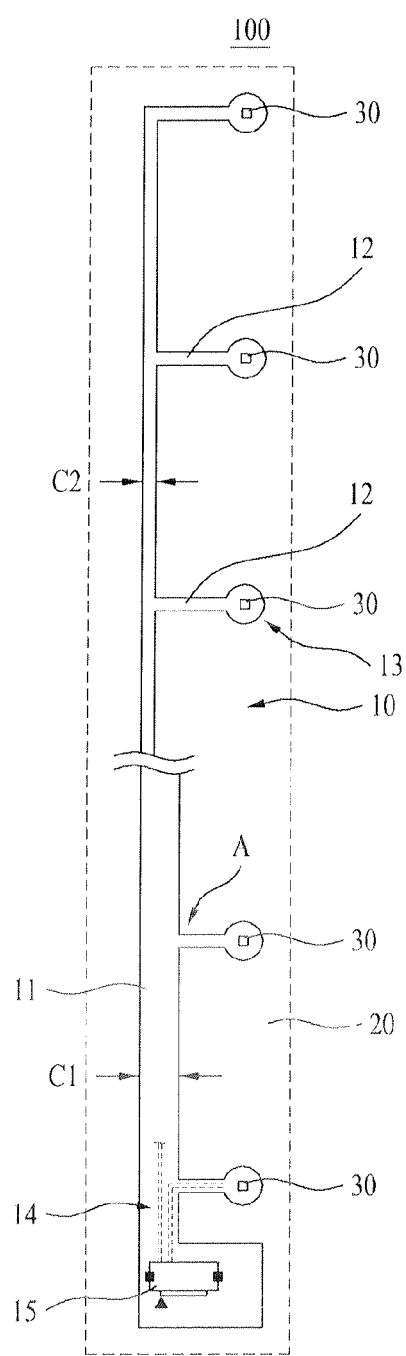
FIG. 5 illustrates a schematic view of a second example of a circuit board.

Or, the width of the first line 11 may be made to become smaller as the first line 11 passes at least one second line 12. That is, as shown in FIG. 5, it is possible that the first line 11 is made to have a first width C1 on the terminal side, and the first line 11 is made to have a second width C2 on the end portion side. That is, it is possible that the width of the first line 11 may be made different from one another at least two portions of the first line 11. Depending on cases, it is possible that the width of the first line 11 may be made different from one another at three, or more than three portions of the first line 11.

Figure 6:
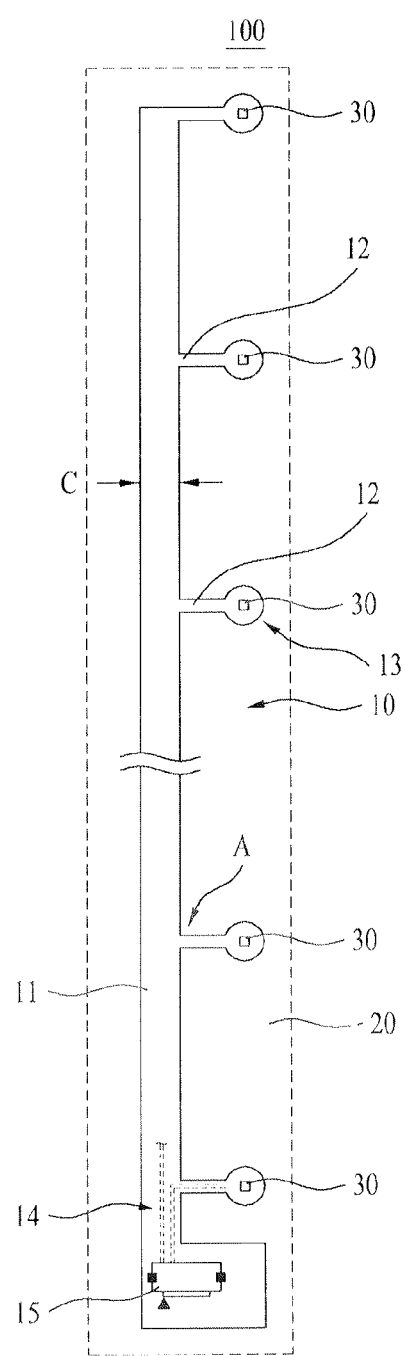
FIG. 6 illustrates a schematic view of a third example of a circuit board.

Referring to FIG. 6, depending on cases, it is possible that the width C of an entire first line 11 is the same.

Thus, depending on material and elasticity thereof, the first line 11 may have the width set as described before.

It is favorable that the plurality of second lines 12 are positioned at fixed intervals for uniformity of the light.

The light guide plate 20 may be provided to an upper side of the circuit board 10. The light guide plate 20 may be adhered to an adhesive portion 16 positioned on the light emitting device mounting portion 13. Therefore, it is possible that the circuit board 10 may be adhered to the light guide plate to fix a position of the circuit board 10.

A plurality of the circuit boards 10 each having the first line and the second line 12 may be arranged on the backlight unit, and the light guide plate 20 may be positioned on the circuit board 10 formed as one unit with the circuit board 10.

Depending on cases, the light guide plate 20 may have a plurality of sub-divided light guide plates.

The backlight unit may be a direct lighting type backlight unit for directing a light to the liquid crystal panel directly, and the light guide plate 20 can diffuse the light from the light emitting device 30 throughout an entire surface of the backlight unit, uniformly.

There may be a diffuser plate positioned on the light guide plate 20 additionally, and besides this, a reflective layer and different optical sheets may be comprised, additionally.

The light guide plate 20 may be formed of a resin. For an example, the light guide plate 20 may be formed of silicon or an acryl group resin, and more specifically, a polymer material, such as polyethyleneterephthalate, polycarbonate, polypropylene, polyethylene, polystyrene, and polyepoxy.

The first line 11 and the second line 12 of the circuit board 10 may be in a state the circuit lines 14 are formed on a substrate of a bar or plate shape. The substrate may be a copper foil adhered to an upper side, or upper and lower sides of a core of FR4, CEM3, or aluminum Al group.

Thus, in general, a material of the light guide plate 20 and a material of the circuit board 10 are different from each other. In a case the light guide plate 20 is adhered to the circuit board 10 at a room temperature to fabricate the backlight unit, deformation, such as bending or curve and the like, is liable to take place due to a difference of expansion under a high temperature environment or a lower temperature environment.

Table 1 shows a result of prediction of deformation under the high temperature environment in a case the light guide plate 20 is formed of acryl group PMMA, and the circuit board 10 is formed of FR4 core.

TABLE 1

| Material | E modulus | Heat Expan. Coefficient | Thickness |
| --- | --- | --- | --- |
| PMMA | 2.3 GPa | 1.6e−4 | 1.5 mm |
| FR4 | 10 GPa | 2.0e−5 | 0.5 mm |
| Adhesive | 0.001 GPa | 2.5e−4 | 0.1 mm |

Figure 7:
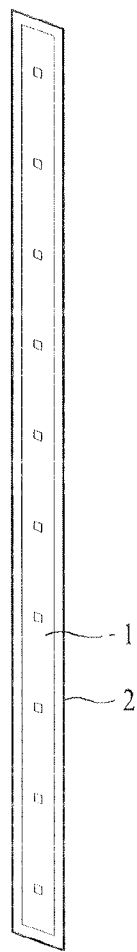
FIG. 7 illustrates a schematic view showing states of a flat circuit board and a light guide plate.
Figure 8:
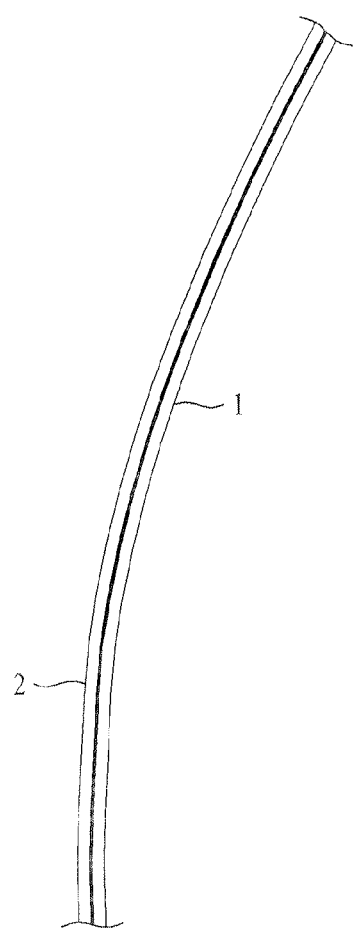
FIG. 8 illustrates a schematic view showing a heat expansion state of the structure in FIG. 7.

Due to above difference of heat expansion coefficients, if the flat circuit board 1 and light guide plate 2 are adhered together as shown in FIG. 7, when a temperature reaches to 60° C. (Humidity 90%), deformation can take place in a direction of the circuit board 1 which has the heat expansion coefficient smaller than the same of the light guide plate 2, causing poor picture quality, such as formation of a dark area and Mura.

Therefore, as described before, if the circuit board 10 is fabricated to have elasticity at the connection point A of the first line 11 and the second line 12, to provide adequate flexibility, it can be made possible to maintain an adhered structure of the circuit board 10 with the light guide plate 20 as well as to prevent the bending and curve from taking place. Depending on cases, it is needless to say that, besides the connection point A, portions or entire first line 11 and second line 12 can be made to have elasticity.

That is, the first line 11 is made to have a column shape, and connected to power and control lines through the terminal 15. And, the second line 12 is made to have an arm shape and connected to the mounting portion 13 the light emitting device 30 is positioned thereon.

According to this, the structure of the circuit board 10 serves as a heat expansion compensation portion which deforms mechanically in conformity with heat expansion and contraction of the light guide plate 20.

The second line 12 of the arm shape may be shaped to have a spring modulus k such that the mechanical deformation can take place in the expansion or contraction direction of the light guide plate 20 at the connection point A or points comprising the connection point A.

In this instance, the spring modulus k is dependent on a length L of the second line 12, and the longer the length L, the easier the deformation. An elastic characteristic of the second line 12 will be described with reference to FIG. 9.

Figure 9:
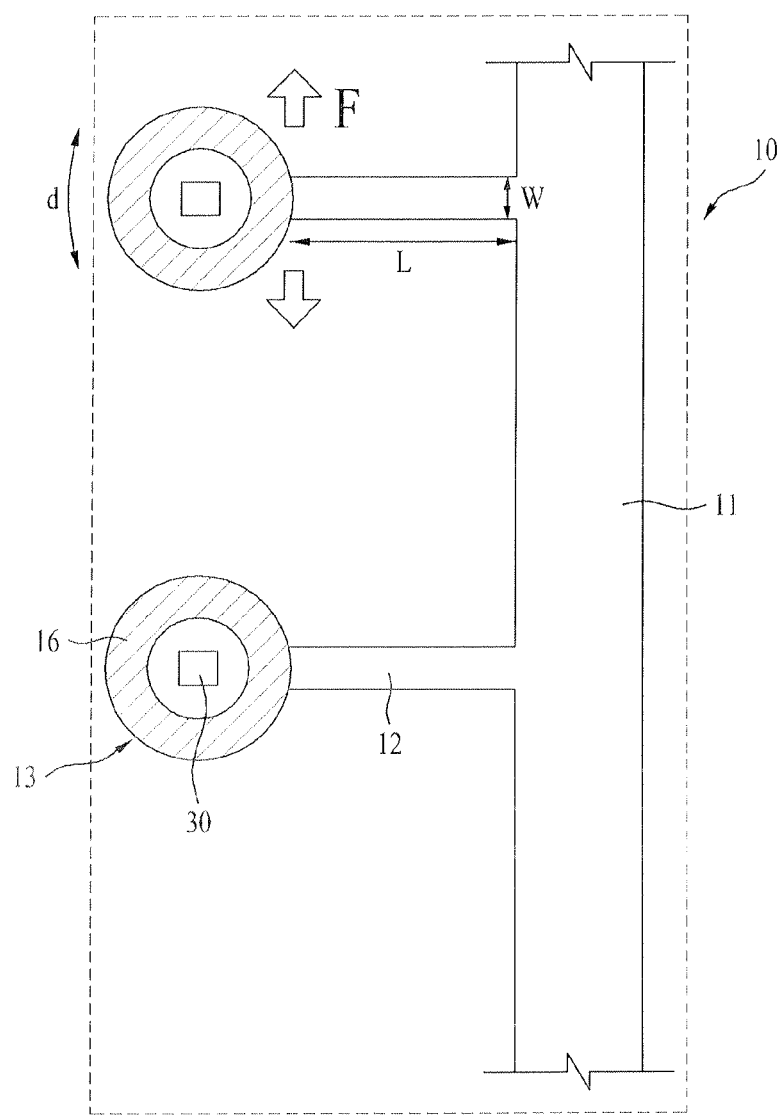
FIG. 9 illustrates an enlarged view for describing elasticity of a second line in a circuit board.

Referring to FIG. 9, it is assumed that the second line 12 has a length L and a width w, and each of the first line 11 and the second line 12 has a thickness t. In this state, since the mounting portion 13 has the light guide plate 20 adhered thereto, if the light guide plate 20 expands or contracts, force F is applied to the mounting portion 13, to cause bending d at the mounting portion 13.

In this instance, the spring modulus k of the connection point can be expressed as an equation 1, below. That is, the spring modulus k is proportional to a Young's modulus and area moment of inertia I, and inversely proportional to cube of a length of the second line 12.

$$k = \frac{3EI}{L^3} \quad (1)$$

$$I = \frac{w^3 t}{12} \quad (2)$$

And, as shown in equation 2, the area moment of inertia I is proportional to cube of the width w and the thickness t.

At the end, it can be known that the longer the length L and the smaller the width w and the thickness t of the second line 12, the deformation takes place the easier.

In this instance, values, such as the Young's modulus, the width and the thickness of the second line 12, are values which can be fixed according to a design and material of the circuit board 10, to have a characteristic that the longer the length L, the easier the deformation.

Figure 10:
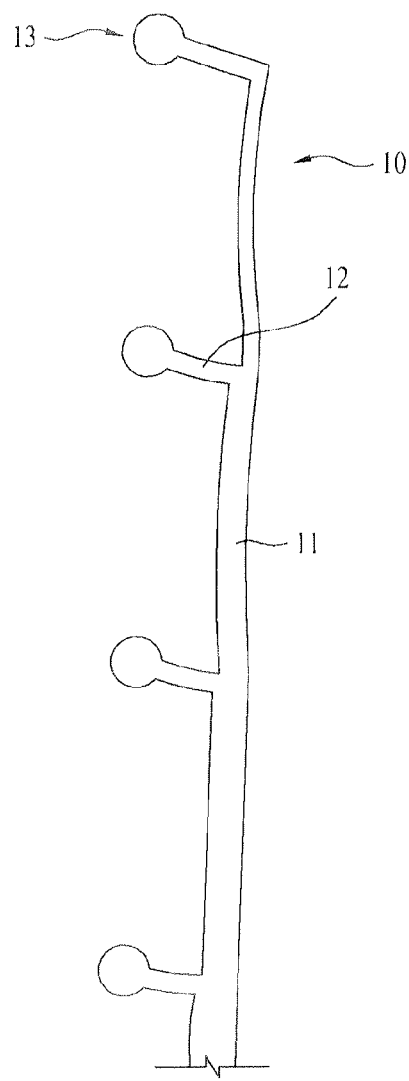
FIG. 10 illustrates a schematic view showing mechanical deformation of the circuit board in FIG. 1.

FIG. 10 illustrates a diagram of simulation in which the deformation of the circuit board 10 caused by the heat expansion and contraction is predicted. As shown, it can be known that the second line 12 deforms according to expansion and contraction of the light guide plate 20, enabling to maintain a contact state of the light guide plate 20 while the light guide plate 20 is not deformed, and the first line 11 can also be deformed. That is, as described before, a portion or an entire first line 11 may also have elasticity.

Therefore, different examples may be taken into account, each of which has an equivalent L value having an equivalent value of the length L even if shapes are different.

Figure 11:
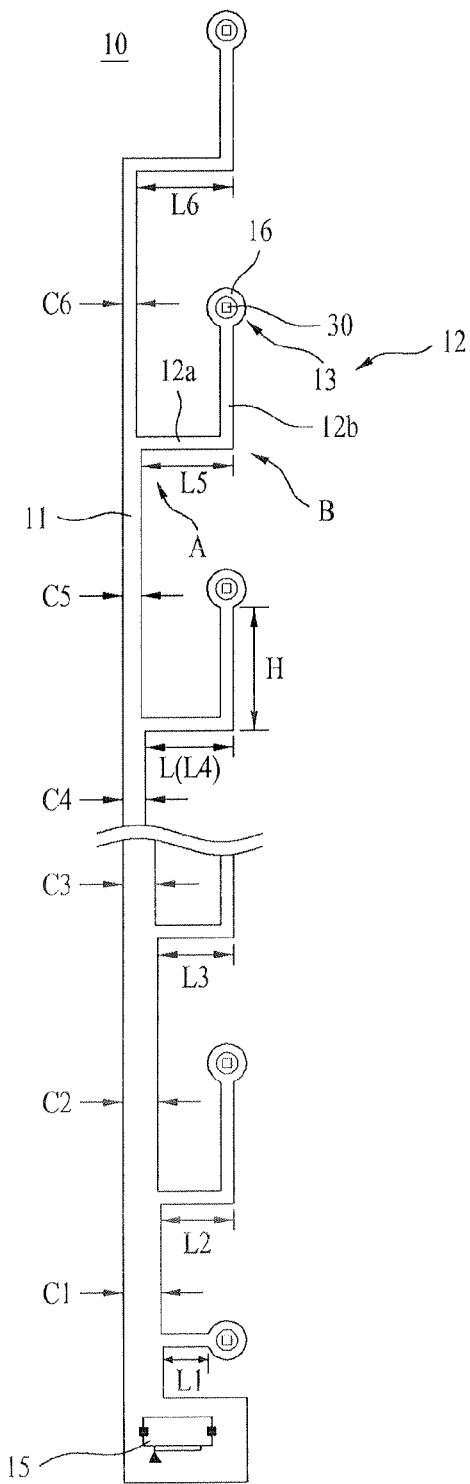
FIG. 11 illustrates a schematic view of a fourth example of a circuit board.

FIG. 11 illustrates an embodiment of the circuit board 10 in which the equivalent L value is set different. That is, FIG. 11 illustrates an example of the second line 12 which has a first portion 12a in which the second line 12 is connected to the first line 11, and a second portion 12b bent from the first portion 12a. The second line 12 has elasticity at the connection point A with the first line 11 and at the bent point B at which the second line 12 is bent.

The example illustrated in FIG. 11 may have elasticity related to a value obtained by adding L to H. However, in this instance, the equation 1 may not be applicable as it is. In this case, a model in which L and H are taken into account together may be applied. However, the model may not be expressed as an analytical equation like the equation 1.

As described before, the width of the first line 11 may become the smaller as the first line 11 becomes the farther from the terminal 15. According to this, a length L (L1 to L6) of the first portion 12a of the second line 12 may become the longer as the first portion 12a becomes the farther from the terminal 15. Therefore, the farther from the terminal 15, the higher the elasticity of the second line 12.

The shapes of the first line 11 and the second line 12 can prevent deformation of the light guide plate 20 more effectively depending on a material of the circuit board 10, adhesion, and a relation of position, of the circuit board 10 with the light guide plate 20.

As shown, the shape of the second line 12 (Denoted with L1) close to the terminal 15 which has a relatively large width may not have the first portion and the second portion like other second line 12.

This is because the mechanical deformation of the second line 12 caused by the heat expansion and contraction of the light guide plate 20 may be smaller than other second line 12 owing to a large width of the first line 11 positioned close to the terminal 15.

However, depending on cases, all shapes of the second lines 12 may be provided to be the same.

Figure 12:
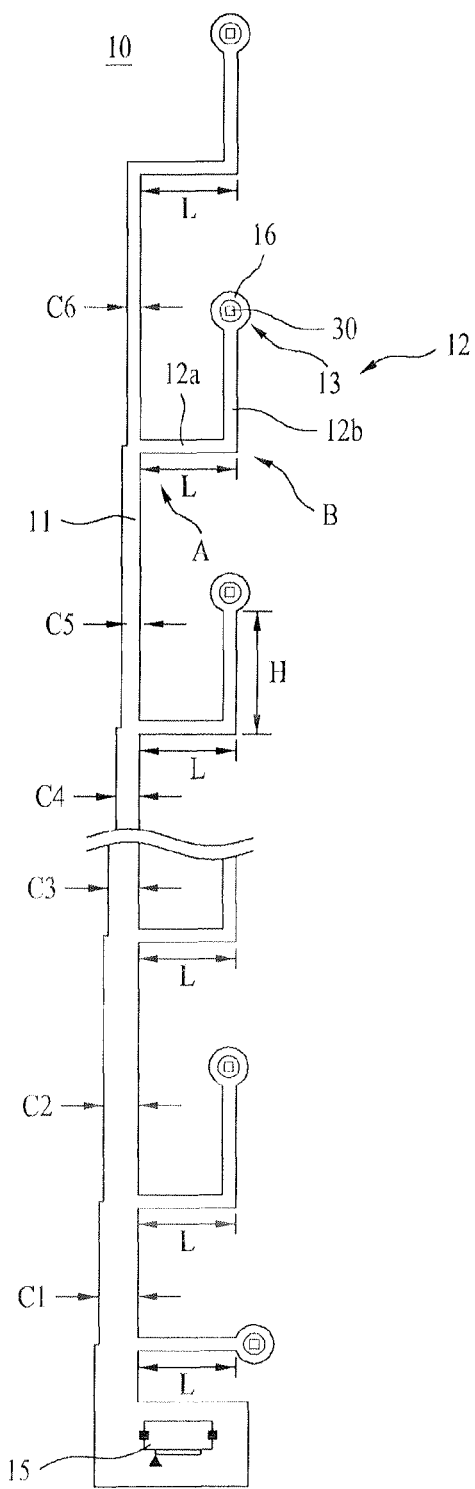
FIG. 12 illustrates a schematic view of a fifth example of a circuit board.

In the meantime, referring to FIG. 12, depending on cases, all of the lengths L of the first portions 12a of the second lines 12 may be made the same. In this instance, though the widths C1 to C6 of the first line 11 may become the smaller as the first line 11 becomes the farther from the terminal 15, width changes of the first line 11 may be made at a side opposite to the side of the FIG. 11.

Figure 13:
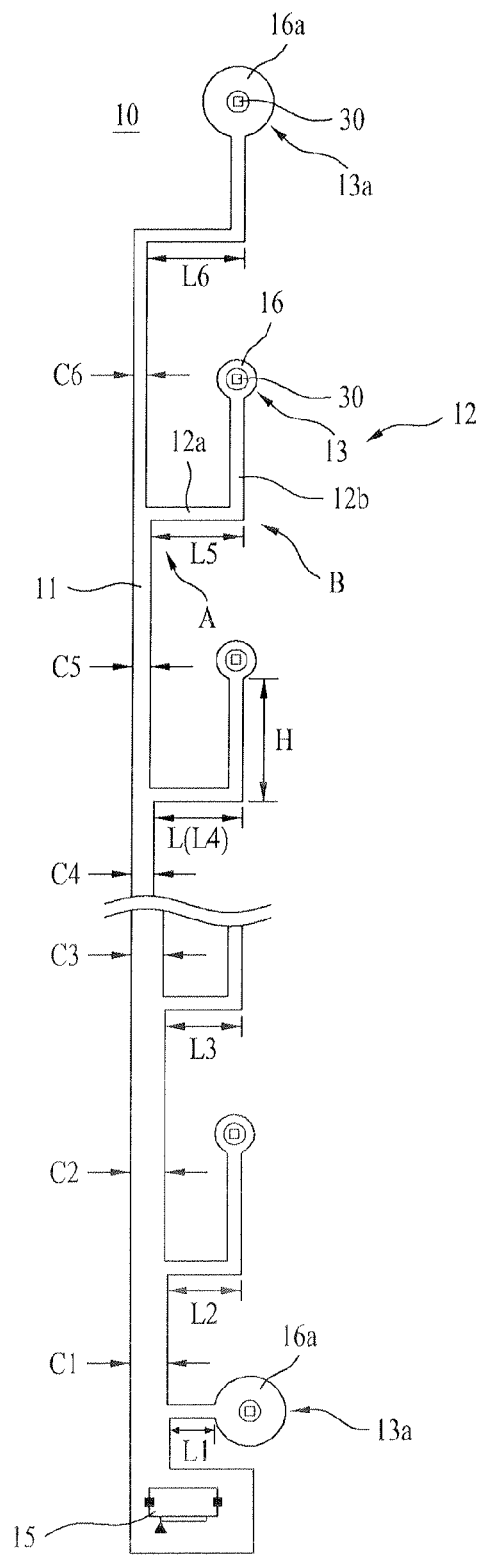
FIG. 13 illustrates a schematic view of a sixth example of a circuit board.

FIG. 13 illustrates changes of areas of the mounting portions 13 with positions thereof. That is, FIG. 13 illustrates that areas of the mounting portions 13 or areas of the adhesive portions 16 positioned at both ends may be large, respectively.

This is because, since the terminal 15 side and the end side opposite to the terminal 15 side may have deformation extents caused by the heat expansion and contraction of the light guide plate 20 relatively small, the adhesive portions 16a can be provided to have large areas, respectively.

Thus, the adhesive portions 16 and 16a may have areas different from each other, and depending on cases, opposite to the case of FIG. 13, the mounting portions 13 or the adhesive portions 16 on both ends may have large areas, respectively.

Figure 14:
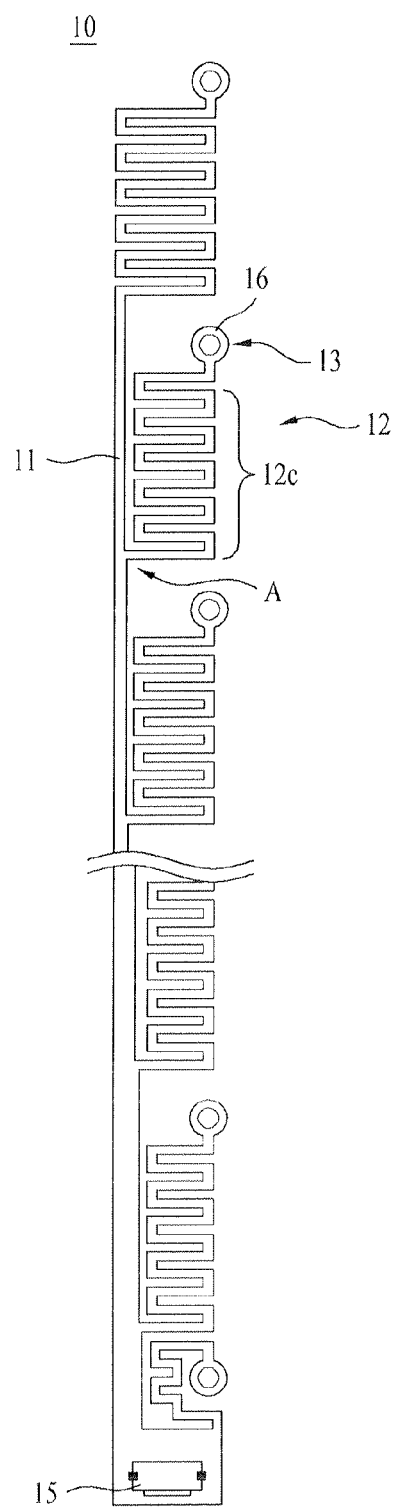
FIG. 14 illustrates a schematic view of a seventh example of a circuit board.

FIG. 14 illustrates the second line 12 having a third portion 12c bent in a plurality of directions. That is, by bending the second line 12 a plurality of number of times, the second line 12 is given to have elasticity.

Thus, the first line 11 and the second line 12 may have appropriate elasticity and shapes to enable to have mechanical deformation in conformity with the expansion and contraction of the light guide plate 20.

By simplifying a structure illustrated in FIG. 9, if it is assumed that the first line 11 is fixed and only the second line 12 is movable owing to elasticity, if properties of an appropriate material is used, the spring modulus k derived from equations 1 and 2 can be about in a range of 2 kN/m.

However, each of the structures illustrated in FIGS. 11 to 14 has the equivalent length L longer than a length of a structure in FIG. 9, the spring modulus k of each of the structures illustrated in FIGS. 11 to 14 will be smaller than 2 kN/m.

Upon reviewing the structures illustrated in FIGS. 9, and 11 to 14, a distance to the light emitting device 30 may have a value of 1 to 5 times of the L.

Figure 15:
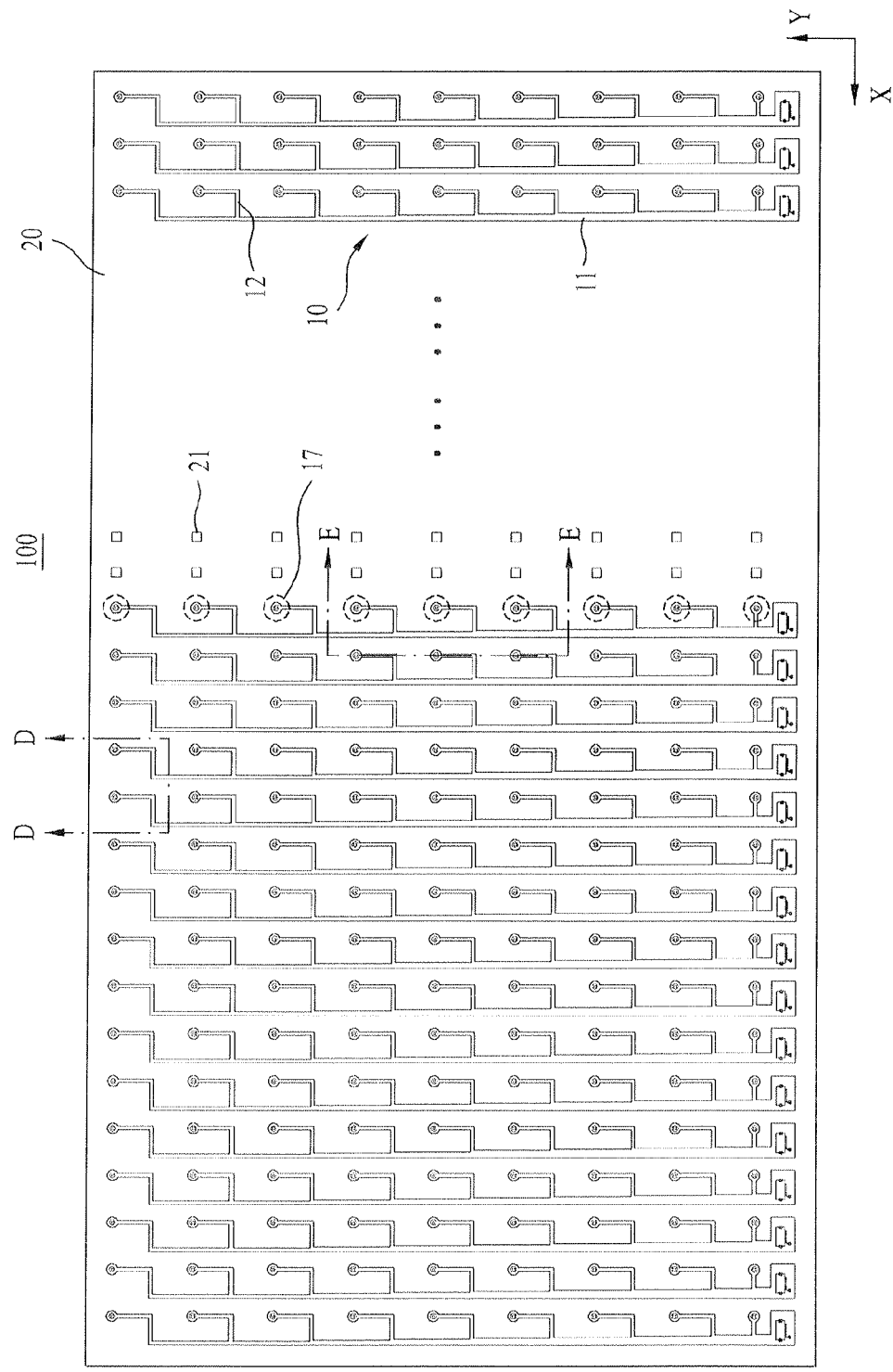
FIG. 15 illustrates a plan view showing a first example of a backlight unit.

FIG. 15 illustrates a plan view showing an example of a backlight unit constructed of the circuit board 10 and the light guide plate 20. That is, a plurality of the circuit boards 10 illustrated in FIG. 11 are arranged in an X direction, and the circuit board 10 has a length fixed by a Y direction.

In this instance, the length of the circuit board 10 in the Y direction and numbers of the second lines 12 and the light emitting devices 30 may be set according to a size of the backlight unit which is dependent on a screen of the display device.

Figure 16:
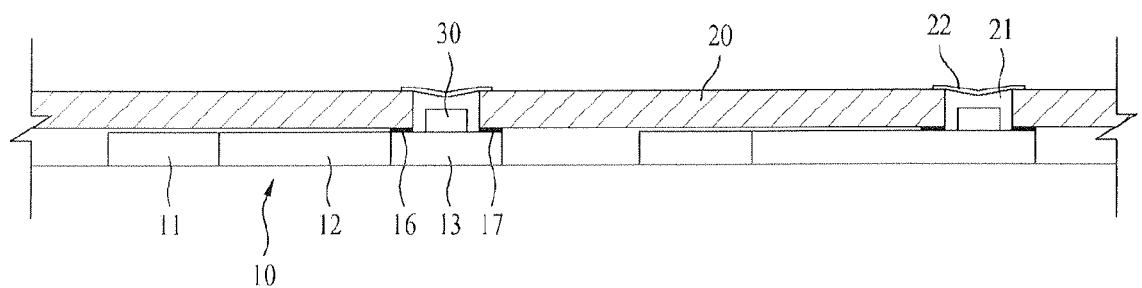
FIG. 16 illustrates a section across a line D-D in FIG. 15.

A hole 21 may be provided at a position of the light guide plate 20 matched to a position of the light emitting device 30. Though FIG. 15 illustrates the holes 21 at a portion of the light guide plate 20, the holes 21 may be provided at all positions of the light emitting devices 30. FIG. 16 illustrates a section across a line D-D in FIG. 15.

Referring to FIG. 16, as described before, the circuit board 10 and the light guide plate 20 are adhered together at the adhesive portion 16b with an adhesive 17.

Since the plurality of circuit boards 10 are not connected to one another in the X direction, no deformation of the circuit board 10 takes place due to the contraction or expansion of the light guide plate 20 in the X direction. However, on the Y direction contraction and expansion of the light guide plate 20, the circuit board 10 can maintain an original shape owing to the elastic structure of the circuit board 10 as described before which enables the circuit board 10 to deal with the expansion and contraction of the light guide plate 20. That is, the state of contact can be maintained while light guide plate 20 is not deformed or deformed to minimum.

A reflective portion 22 may be provided on the hole 21. The reflective portion 22 can make the light from the light emitting device 30, not to travel outward directly, but to reflect toward the light guide plate 20.

Depending on cases, instead of the reflective portion 22, a diffusing portion may be positioned thereon to spread the light uniformly, or the hole 21 may be filled with resin.

In the meantime, no holes 21 may be formed, but the light guide plate 20 may be positioned to cover upper sides of the light emitting devices 30.

As shown, the first lines 11 are aligned along the Y direction and each of the second lines 12 is branched in the X direction and bent in the Y direction again. That is, though the first lines 11 and the second lines 12 are perpendicular to one another, it is needless to say that, depending on cases, the first lines 11 and the second lines 12 may not be perpendicular to each other, but may be at other angle.

Figure 17:
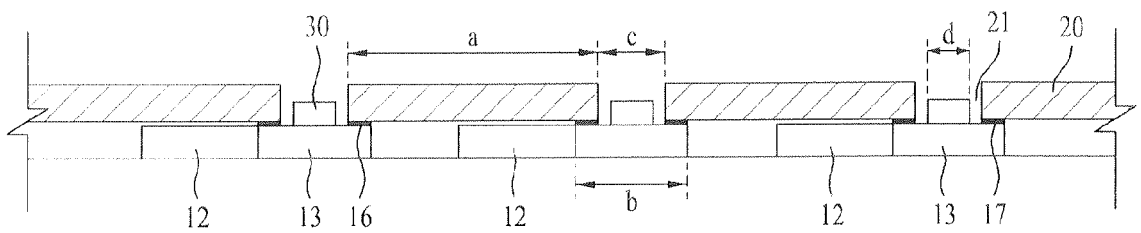
FIG. 17 illustrates a section across a line E-E in FIG. 15.

FIG. 17 illustrates a section across a line E-E in FIG. 15, showing that the holes 21 are positioned in portions of the light guide plate 20 at which the light emitting devices 30 are positioned respectively, showing a distance a between the holes 21, a size b of the mounting portion 13, a size c of the hole 21, and a size d of the light emitting device 30.

As shown, it can be known that the distance a between the holes 21 is the largest, and the sizes become the smaller in an order of the size b of the mounting portion 13, the size c of the hole 21, and the size d of the light emitting device 30.

Figure 18:
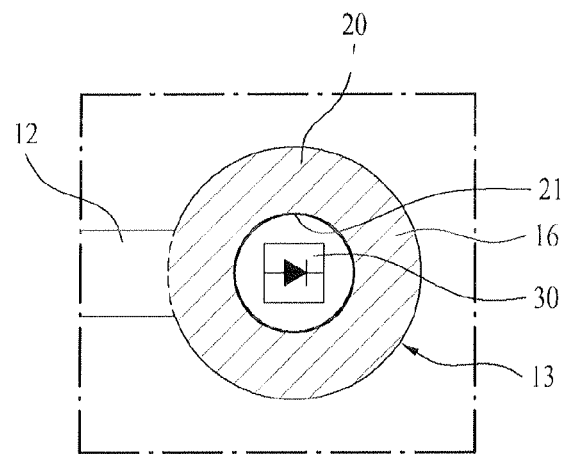
FIG. 18 illustrates an enlarged view showing an example of a mounting portion and a hole.
Figure 19:
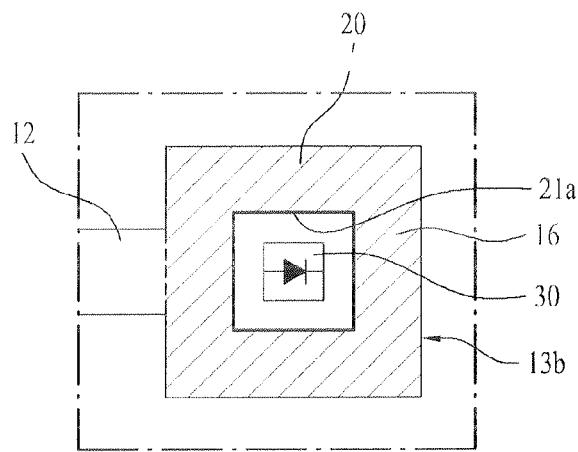
FIG. 19 illustrates an enlarged view showing another example of a mounting portion and a hole.

Referring to FIGS. 18 and 19, the hole 21 may have a shape identical to a shape of the mounting portion 13. That is, as shown in FIG. 18, if the mounting portion 13 is circular or elliptical, the hole 21 may also be circular or elliptical, which is favorable for securing a fixed adhesion area of the adhesive portion 16.

Alikely, referring to FIG. 19, if the mounting portion 13b is square, the hole 21a may also be square.

Figure 20:
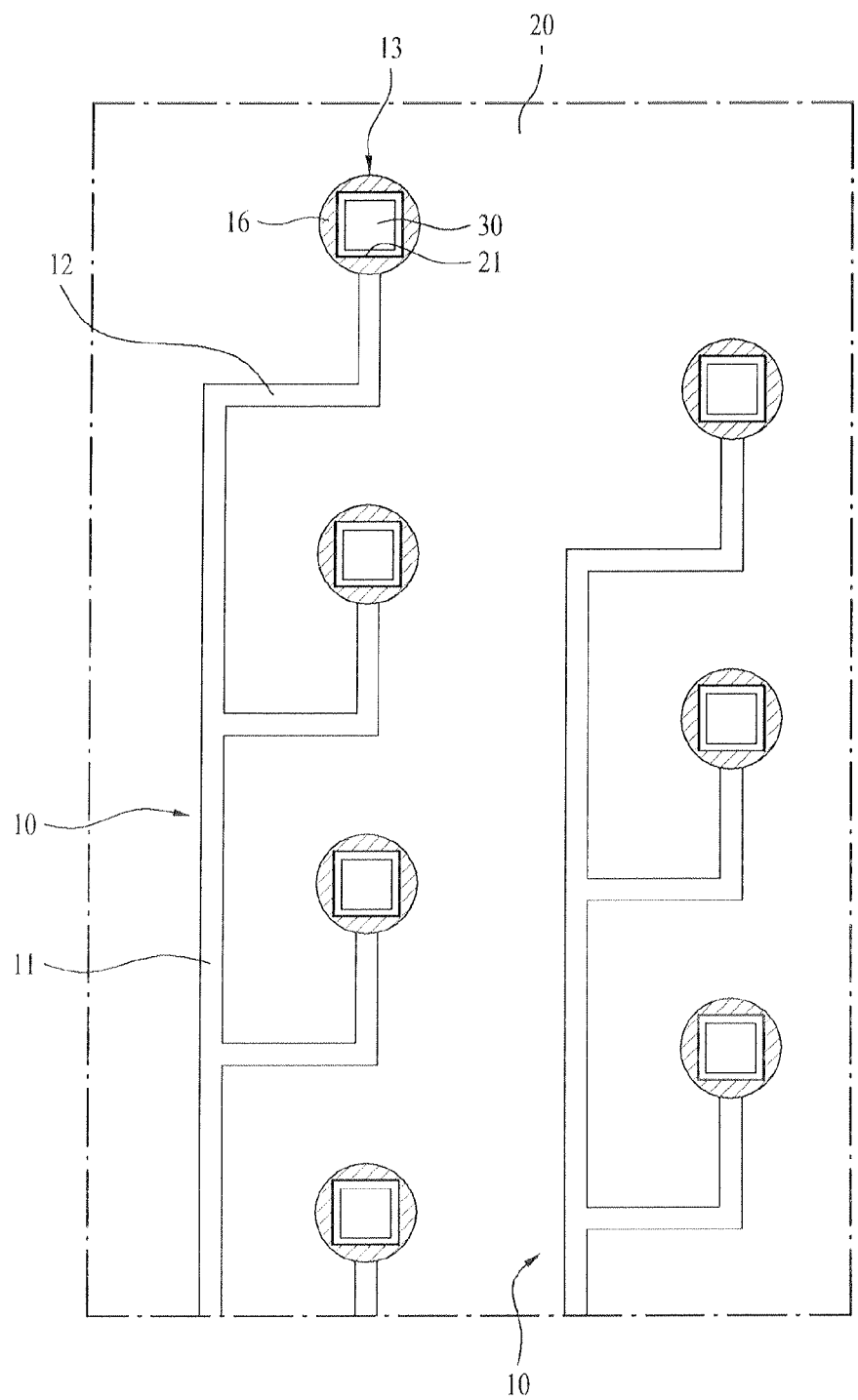
FIG. 20 illustrates a plan view showing a second example of a backlight unit.

Referring to FIG. 20, the holes 21 in the light guide plate 20 may have positions different between rows. That is, the holes 21 may be arranged in zigzag, varying alignment positions of the circuit boards 10, too.

Figure 21:
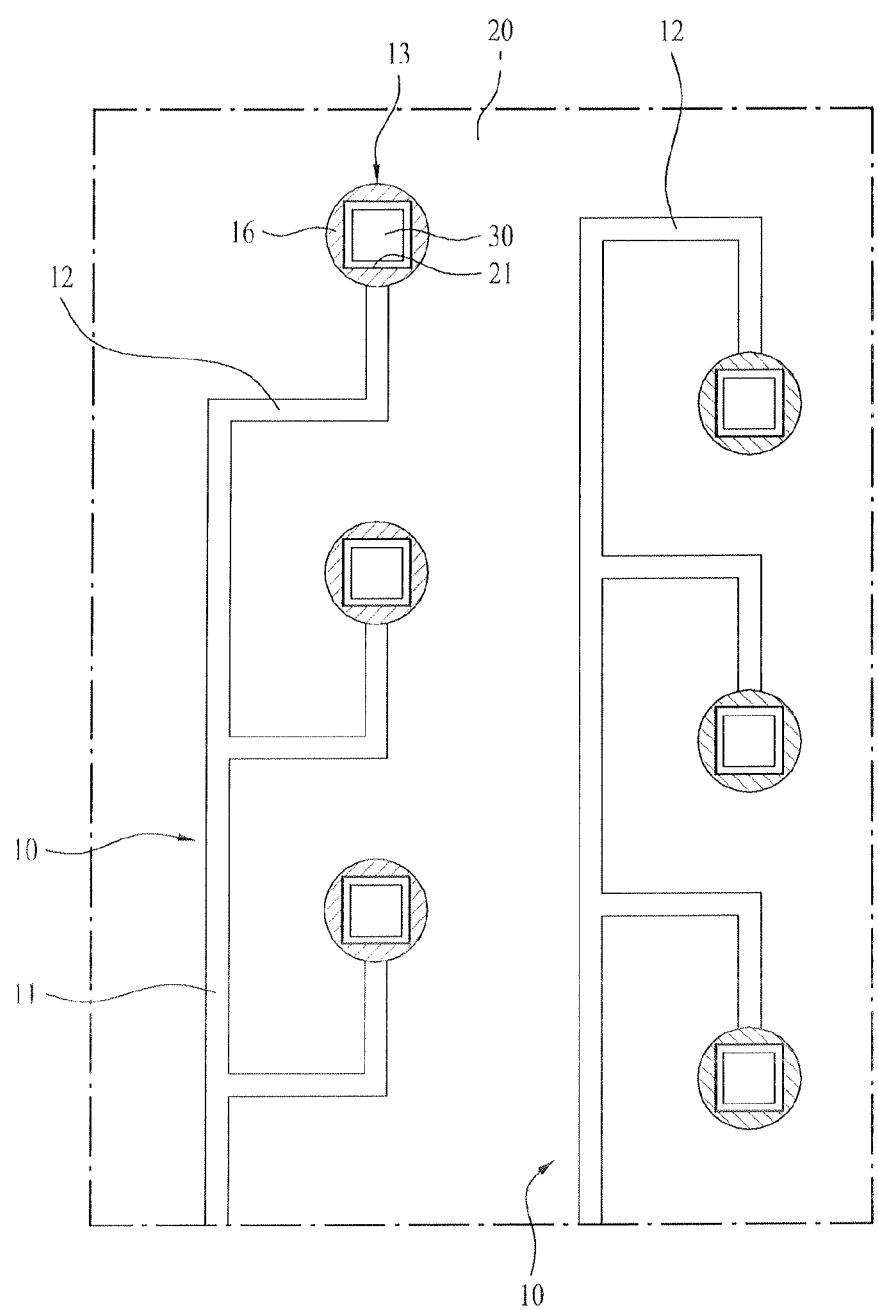
FIG. 21 illustrates a plan view showing a third example of a backlight unit.

In the meantime, referring to FIG. 21, matched to the holes 21 arranged in zigzag thus, the circuit board 10 on one side may have the second lines bent in an opposite direction.

That is, if one circuit board 10 has the second lines bent in a first direction, an adjacent circuit board 10 may have the second lines bent in a second direction which is opposite to the first direction.

Figure 22:
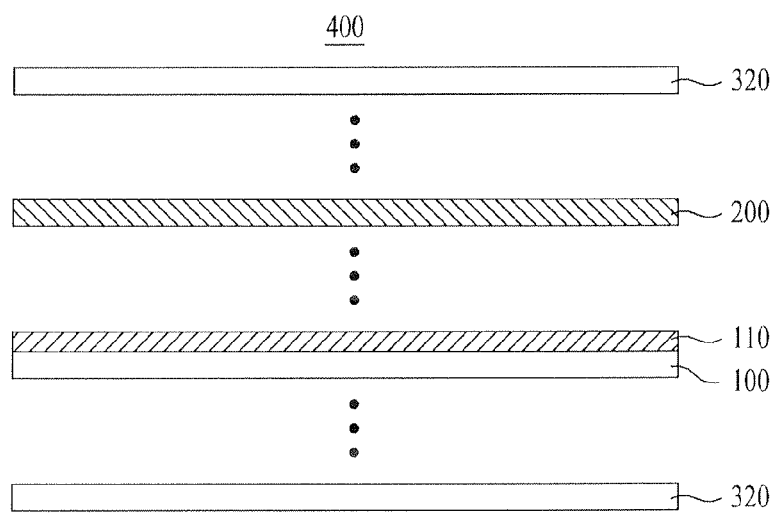
FIG. 22 illustrates an exploded view showing an example of a liquid crystal display device having a backlight unit.

Referring to FIG. 22, a liquid crystal panel 200 may be provided on the backlight unit 100 to form a liquid crystal display device 400.

Figure 23:
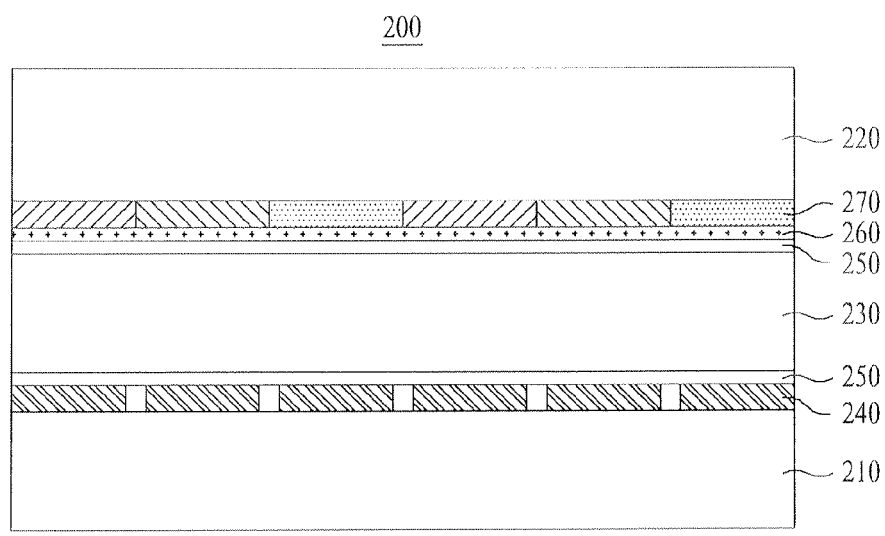
FIG. 23 illustrates a section showing an example of a liquid crystal panel.

The liquid crystal panel 200 on the backlight unit 100 comprises upper and lower substrates faced to each other and a liquid crystal layer 230 injected therebetween (See FIG. 23).

There may be a driving unit (Not shown) on one side of the liquid crystal panel 200 for driving the liquid crystal panel 200.

And, there are a bottom cover 310 for covering the backlight unit 100, and an upper cover 320 on the liquid crystal panel 200 for covering a front side of the liquid crystal panel 200.

The liquid crystal panel 200 has a matrix of liquid crystal cells which are unit pixels, for producing a picture by controlling light transmissivity of the liquid crystal cells according to picture signal information from the driving unit.

The driving unit may include a flexible circuit board FPC, a driving chip mounted to the FPC, and a circuit board PCB connected to the other side of the FPC.

As shown, the backlight unit 100 may be positioned in rear of the liquid crystal panel 200, and a plurality of optical sheets 110 may be placed on the backlight unit 100.

The optical sheets 110 are positioned on a rear of the liquid crystal panel 200 and may include a diffusion sheet, a prism sheet, and a protective sheet.

In this instance, the diffusion sheet serves to diffuse and supply the light from the backlight unit 100 to the liquid crystal panel 200. The prism sheet has a shape in which an array of triangular prisms is placed on an upper surface. The prism sheet serves to make the light diffused at the diffusion sheet to converge to a flat surface of the overlying liquid crystal panel 200 in a vertical direction.

The prism sheet has micro-prisms formed thereon each at a predetermined angle. Most of the light passed through the prism sheet travels vertically to provide a uniform brightness distribution. The protective sheet positioned at uppermost side protects the prism sheet which is susceptible to scratch.

Referring to FIG. 23, formed on the lower substrate 210 of the liquid crystal panel 200, there are a matrix of a plurality of gate lines and a plurality of data lines, and a pixel electrode and a thin film transistor TFT 240 formed at every crossed portion of the gate lines and the data lines.

A signal voltage applied through the thin film transistor 240 is supplied to the liquid crystal layer 230 by the pixel electrode, to orient the liquid crystal layer 230 according to the signal voltage to fix the light transmissivity.

Formed on the upper substrate 220, there are color filters 270 of RGB pixels for producing a predetermined color as the light passes therethrough, and a common electrode 260 of a transparent conductive material of, such as ITO (Indium Tin Oxide) and IZO (Indium Zinc Oxide). There may be alignments films 250 on upper and lower sides of the liquid crystal layer 230.

The liquid crystal display device 400 described above may maximize a performance thereof by using the backlight unit 100 described before.

A liquid crystal TV set may be fabricated of the liquid crystal display device 400.

Figure 24:
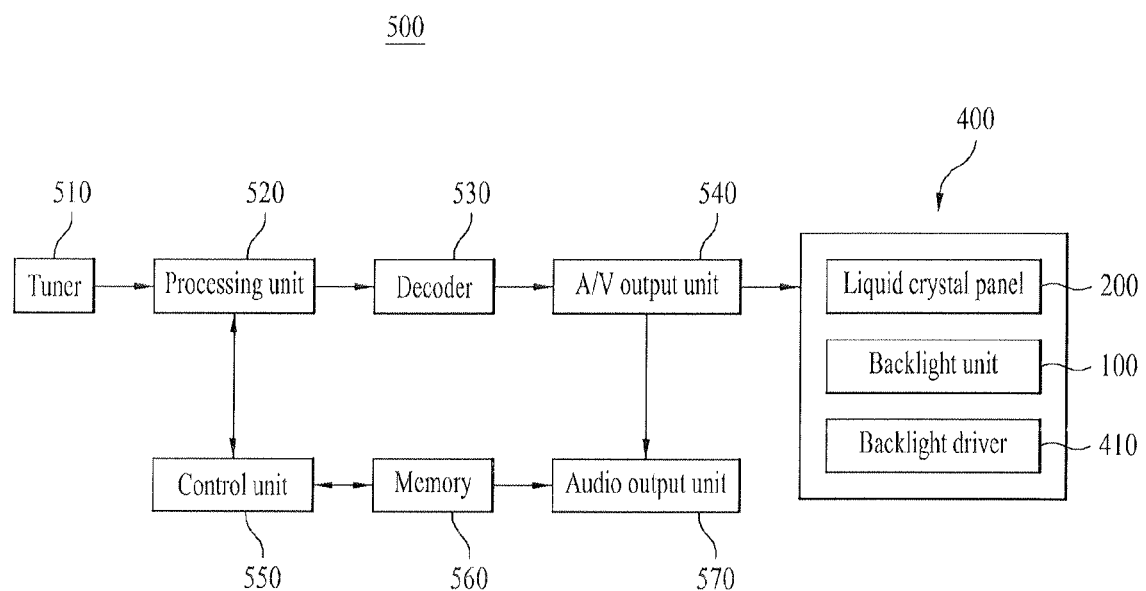
FIG. 24 illustrates a block diagram of a liquid crystal TV set having a liquid crystal display device.

Referring to FIG. 24, the liquid crystal TV set receives a broadcasting data stream from a tuner 510, transmits the a broadcasting data stream through a processing unit 520, a decoder 530, and an A/V output unit 540, and displays the a broadcasting data stream on the liquid crystal display device 400.

The tuner 510 or the processing unit 520 may be controlled by a control unit 550, and the control unit 550 may include a memory 560, additionally.

Upon handling the liquid crystal TV set to select and designate any one broadcasting channel a user desires, the control unit 550 controls the tuner 510 and the processing unit 520 to select the desired broadcasting station, and the processing unit 520 splits the data stream of the broadcasting program provided through the broadcasting channel into audio and video data, and forwards the same.

Then, the decoder 530 decodes the data from the processing unit 520 into audio and video signals, and makes the audio and video signals to be forwarded to the liquid crystal display device 400 through the A/V output unit 540 or to the audio output unit 570, such as a speaker unit.

In this instance, the backlight unit 100 is driven by the backlight driving unit 410 to display a picture forwarded to the liquid crystal panel 200.

In the meantime, the broadcasting data stream may be transmitted to the processing unit 520 through the Internet.

It is needles to say that the different embodiments described taking various examples can be combined to one another. For an example, the shapes of the mounting portion 13 described with reference to FIGS. 2 to 4 may be applied to the embodiments described with reference to FIGS. 11, and 12 to 14, and the matter related to an area change of the mounting portion 13 described with reference to FIG. 13 may also be applicable to FIG. 1.

Alikely, description related to the width of the first line 11 described with reference to FIGS. 1, 5 and 6 may be applicable to the embodiment described with reference to FIGS. 11, 12 to 14 as it is.

Thus, though examples are described, the combinations of the embodiments mentioned herein are not limited to above examples.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A backlight unit comprising:
a plurality of circuit boards arranged on a plane, wherein the circuit boards are separately arranged on the plane, each of the plurality of circuit boards comprising:
a first line arranged in a first direction, the first line having circuit lines provided thereto,
a plurality of second lines branched from the first line in a second direction, and
a plurality of light emitting device mounting portions connected in parallel, each light emitting device mounting portion connected to an end of one of the second lines, wherein the light emitting device mounting portion comprises a connection portion, and the second lines are bendable from the first line;

a plurality of light emitting devices mounted on the light emitting device mounting portion; and a light guide plate on the plurality of circuit boards, wherein the light guide plate is connected with at least a portion of the circuit boards.

2. The backlight unit as claimed in claim 1, wherein the second lines branched in the second direction are bent in the first direction.

3. The backlight unit as claimed in claim 1, wherein the first direction is substantially perpendicular to the second direction.

4. The backlight unit as claimed in claim 1, wherein the light guide plate has a hole for placing the light emitting devices therein.

5. The backlight unit as claimed in claim 4, further comprising a reflective portion on the hole.

6. The backlight unit as claimed in claim 1, wherein the first line has a width that varies as the first line goes farther in one direction.

7. The backlight unit as claimed in claim 1, wherein the first line has a width which becomes gradually smaller as the first line goes farther in one direction.

8. The backlight unit as claimed in claim 1, wherein the plurality of circuit boards are not connected to one another.

9. The backlight unit as claimed in claim 1, wherein the light guide plate is connected to the connection portion of the light emitting device mounting portion.

10. The backlight unit as claimed in claim 9, wherein the light guide plate is connected to the connection portion with an adhesive.

11. The backlight unit as claimed in claim 1, wherein the connection portion is located at a periphery of a location where the light emitting devices are mounted.

12. The backlight unit as claimed in claim 1, wherein the second lines are branched from the first line while being spaced apart by a predetermined distance.

13. A liquid crystal display device, comprising:

a backlight unit comprising a plurality of circuit boards arranged on a plane, wherein the circuit boards are separately arranged on the plane, each of the circuit boards comprising a first line arranged in a first direction, the first line having circuit lines provided thereto, a plurality of second lines branched from each first line in a second direction, and a plurality of light emitting device mounting portions connected in parallel, each light emitting device mounting portion connected to an end of one of the second lines, wherein the light emitting device mounting portion comprises a connecting portion a plurality of light emitting devices mounted on the light emitting device mounting portion; and a light guide plate on the plurality of circuit boards, wherein the light guide plate is connected with at least a portion of the circuit boards, and the second lines are bendable in a direction of the first line; and a liquid crystal panel positioned on the backlight unit.

14. The liquid crystal display device as claimed in claim 13, wherein the second lines are bendable in a longitudinal direction of the first line.

15. The liquid crystal display device as claimed in claim 13, wherein bending of the second lines is caused by expansion or contraction of the light guide plate.

16. The backlight unit as claimed in claim 1, wherein the second lines are bendable in a longitudinal direction of the first line.

17. The backlight unit as claimed in claim 1, wherein bending of the second lines are caused by expansion or contraction of the light guide plate.

18. A backlight unit comprising:

a plurality of circuit boards arranged on a plane, wherein the circuit boards are separately arranged on the plane, each of the plurality of circuit boards comprising:

a first line arranged in a first direction, the first line having circuit lines provided thereto, a plurality of second lines branched from the first line in a second direction, a light emitting device mounting portion connected to an end of the second lines, wherein the light emitting device mounting portion comprises a connection portion, and the second lines are bendable from the first line;

a plurality of light emitting devices mounted on the light emitting device mounting portion; and a light guide plate on the plurality of circuit boards, a plurality of light emitting devices mounted on the light emitting device mounting portion; and a light guide plate on the plurality of circuit boards, wherein the light guide plate is connected with at least a portion of the circuit boards, and wherein the first line has a width which becomes gradually smaller as the first line goes farther in one direction.

* * * * *